US012704013B2

(12) United States Patent
Lee

(10) Patent No.: US 12,704,013 B2
(45) Date of Patent: Aug. 11, 2026

(54) ANCHOR SYSTEM WITH INTEGRATED CABLE PIN

(71) Applicant: Overhead Door Corporation, Lewisville, TX (US)

(72) Inventor: Bradley J. Lee, Arlington, TX (US)

(73) Assignee: Overhead Door Corporation, Lewisville, TX (US)

( * ) Notice: Subject to any disclaimer, the term of this patent is extended or adjusted under 35 U.S.C. 154(b) by 0 days.

(21) Appl. No.: 18/498,941

(22) Filed: Oct. 31, 2023

(65) Prior Publication Data

US 2025/0137308 A1 May 1, 2025

(51) Int. Cl.
*E05D 15/16* (2006.01)
*E05D 15/22* (2006.01)

(52) U.S. Cl.
CPC ...... *E05D 15/165* (2013.01); *E05D 2015/225* (2013.01); *E05Y 2201/654* (2013.01); *E05Y 2600/46* (2013.01); *E05Y 2600/622* (2013.01); *E05Y 2600/626* (2013.01); *E05Y 2900/106* (2013.01)

(58) Field of Classification Search
None
See application file for complete search history.

(56) References Cited

U.S. PATENT DOCUMENTS 1,189,217 A 6/1916 Ashby
1,747,206 A * 2/1930 Wilson .................. E05D 15/248 16/DIG. 31
2,871,932 A * 2/1959 Stroup .................. E05D 15/242 160/40
3,021,896 A 2/1962 Buono
3,104,699 A * 9/1963 Wolf ........................ E05D 15/24 160/40
3,198,242 A * 8/1965 Crosswell ............... E06B 3/485 160/40
3,334,681 A * 8/1967 Crosswell ............. E05D 15/242 16/86 A
3,693,693 A * 9/1972 Nom .......................... B60J 5/14 160/195

(Continued)

OTHER PUBLICATIONS

AMARR, Installation Instructions, Commercial Sectional Doors, Form #161 Rev. 12/20, pp. 1-46.

(Continued)

*Primary Examiner* — Catherine A Kelly
(74) *Attorney, Agent, or Firm* — Haynes and Boone, LLP

(57) ABSTRACT

An anchor system for securing a lift cable to a movable barrier comprises a pin couplable to the lift cable and a bracket attachable to the movable barrier. The bracket comprises a first wall having a first hole, a second wall spaced from the first wall to receive the lift cable therebetween, the second wall having a second hole, the first hole and the second hole aligned and configured to receive the pin, and a first portion of a third wall extending obliquely relative to the first wall. The anchor system also comprises a guide lock shaped to fit at least partially within the bracket, and movable relative to the bracket between a position where the lift cable is couplable to the pin and a position where the lift cable is uncouplable from the pin, the guide lock being configured to displace the pin.

18 Claims, 11 Drawing Sheets

(56) References Cited

U.S. PATENT DOCUMENTS

| | | | | | |
|---|---|---|---|---|---|
| 5,404,927 | A * | 4/1995 | Bailey | E05D 13/12 16/97 |
| 6,112,464 | A * | 9/2000 | Grisham | E05D 13/1261 160/199 |
| 6,119,307 | A * | 9/2000 | Weishar | E06B 3/485 16/229 |
| 6,123,139 | A * | 9/2000 | Kalempa | E06B 3/485 160/133 |
| 6,145,570 | A * | 11/2000 | Mullet | E05D 13/00 160/201 |
| 6,401,793 | B1 | 6/2002 | Martin | |
| 6,588,482 | B2 * | 7/2003 | Wright | E05D 13/10 160/193 |
| 6,776,210 | B2 * | 8/2004 | Wells | E06B 3/485 160/209 |
| 6,792,998 | B2 * | 9/2004 | David | E05D 15/165 16/DIG. 1 |
| 6,843,300 | B2 * | 1/2005 | Mullet | E05D 15/242 160/229.1 |
| 7,861,762 | B2 * | 1/2011 | Meichtry | E05D 15/24 160/205 |
| 8,091,607 | B2 * | 1/2012 | Aquilina | E05D 15/24 160/201 |
| 8,720,112 | B2 * | 5/2014 | Eungard | E05F 15/686 49/200 |
| 8,893,764 | B2 * | 11/2014 | Mascari | E05F 5/003 16/82 |
| 9,303,683 | B1 * | 4/2016 | Newcomb, Jr. | E04B 1/34321 |
| 12,258,801 | B2 * | 3/2025 | Roesner | E05D 15/165 |
| 2006/0053694 | A1 * | 3/2006 | Hormann | E05D 13/006 49/197 |
| 2007/0256798 | A1 | 11/2007 | Aquilina | |
| 2009/0288344 | A1 | 11/2009 | Schram | |
| 2012/0234507 | A1 * | 9/2012 | Rauch | E05D 13/1292 29/426.1 |
| 2024/0052680 | A1 * | 2/2024 | Lee | E05F 15/686 |
| 2024/0052681 | A1 * | 2/2024 | Lee | E05F 15/686 |

OTHER PUBLICATIONS

C.H.I. Overhead Doors, Installation Instructions for Commercial Steel Garage Doors, 2002, pp. 1-40.
Garaga, Installation Manual, Nov. 2021, pp. 1-24.
Horman, Installation Instructions & Owner's Manual, Hormann Sectional Garage Doors with Standard Track, H/ (Issue 05.18, print 05.18) May 2018, pp. 1-32.
Ideal Door, Commercial & Industrial Sectional Doors, Installation & Maintenance, 2019, 013007-R02-0219, pp. 1-28.
Northwest Door, Inc., Garage Door Installation Instructions, VS1.1 1-03-SL, 14 pages, Tacoma, Washington.
Wayne Dalton, Aluminum Full View Models 464, 451, 452, Torsion Commercial Standard Lift Installation Instructions and Owner's Manual, Rev12_01/Apr. 2021, 26 pages.

* cited by examiner

ANCHOR SYSTEM WITH INTEGRATED CABLE PIN

RELATED APPLICATIONS

The present disclosure is related to co-pending U.S. patent application Ser. No. 17/886,013, filed Aug. 11, 2022, titled ANCHOR SYSTEM FOR A BRACKET OF A MOVABLE BARRIER and co-pending U.S. patent application Ser. No. 17/885,885, filed Aug. 11, 2022, titled LOWER BRACKET AND ANCHOR SYSTEM FOR A MOVABLE DOOR, both of which are incorporated herein by reference in their entireties.

TECHNICAL FIELD

The present disclosure relates generally to the field of movable barriers. In some examples the present disclosure relates to brackets and anchor systems for lift cables usable on moveable barriers.

BACKGROUND

Movable barriers, such as upward-acting sectional or single panel garage doors, residential and commercial rollup doors, and slidable and swingable gates, are used to alternatively allow and restrict entry to building structures and property. A commonly used movable barrier is an upward-acting slidable barrier. Typical upward-acting barriers may be raised by lift cables. On each side of a movable barrier, one end of a lift cable is attached to a lower portion. The other end of the lift cable is secured to a cable drum. As a barrier operator turns the cable drum, the lift cable wraps around the cable drum and the movable barrier is raised along a track on each side of the barrier.

For typical movable barriers, the lift cables are attached to the lower portions of the movable barrier by lower brackets. The lower brackets are secured to an inward-facing side of the movable barrier with fasteners, such as screws or bolts. In this way, the upward acting force provided by the lift cables in an upward direction are transferred to the movable barrier through the fasteners alone. Because the lower brackets are attached to the movable barrier by the fasteners only, the entire weight of the movable barrier is supported by the fasteners. Bearing this weight, the attachment of the lift cables to the movable barrier by the fasteners may be prone to failure. The attachment by the fasteners may be weakened over time due to repeated use, repeated removal and reinstallation of the fasteners for servicing or other reasons, or general wear and tear.

In addition, the lower brackets securing the movable barrier to lift cables on either side are typically unique to the side of the movable barrier. For example, a movable barrier installation may require a left lower bracket as well as a right lower bracket. Because the two lower brackets are not interchangeable, the number of necessary unique parts for assembly or servicing of typical movable barriers is increased, leading to increased manufacturing and inventory complexity and cost.

Furthermore, lift cables can be prone to break and/or to malfunction. It is common for typical anchor systems and lower brackets of anchor systems to be installed and reinstalled multiple times throughout the life of a movable barrier to service malfunctioning or broken lift cables. To perform the uninstallation and reinstallation, anchor systems usually require disassembly and reassembly. Disassembly and reassembly is time consuming and difficult. Additionally, certain components may be hard to access or lost easily during the process. Further, in conventional anchor systems, components may be prone to bending when a lift cable breaks. When components of the anchor system deform, disassembly and reassembly becomes increasingly difficult. Therefore, there is a need for anchor systems that more effectively lend themselves to a better user experience.

SUMMARY

This disclosure discloses an improved anchor system. In some examples, the anchor system may meet some of the disadvantages and shortcomings of conventional anchor systems. Some embodiments may not require disassembly and reassembly to uninstall and reinstall a lift cable; may not bend when a lift cable breaks; and may include components which are easy to adjust and access, should disassembly and reassembly ever be desired, among other things.

Consistent with some examples, an anchor system for securing a lift cable to a movable barrier may comprise a pin couplable to the lift cable and a bracket attachable to the movable barrier. The bracket may comprise a first wall having a first hole, a second wall spaced from the first wall to receive the lift cable therebetween, the second wall having a second hole, the first hole and the second hole aligned and configured to receive the pin, and a first portion of a third wall extending obliquely relative to the first wall. The anchor system may comprise a guide lock shaped to fit at least partially within the bracket, and movable relative to the bracket between a position where the lift cable is couplable to the pin and a position where the lift cable is uncouplable from the pin, the guide lock being configured to displace the pin.

In some examples, the bracket may be configured to distribute loads applied to the pin to the movable barrier when the movable barrier is lifted. The anchor system may further comprise a spring pin configured to extend through a first spring pin hole in the guide lock and through a second spring pin hole in the pin to hold the pin in the guide lock. The first portion of the third wall may include a first portion of a guide track configured to receive the guide lock. The guide lock may be configured to slide within the first portion of the guide track to a first position to secure the lift cable to the movable barrier between the first wall and the second wall.

In some examples, the bracket may further comprise a fourth wall having a fourth hole, and a fifth wall spaced from the fourth wall to receive the lift cable therebetween, the fifth wall having a fifth hole, the fourth hole and the fifth hole aligned and configured to receive the pin couplable to the lift cable. The second portion of the third wall may extend obliquely relative to the fourth wall and include a second portion of the guide track configured to receive the guide lock, and the guide lock may be further configured to slide within the second portion of the guide track to a second position to secure the lift cable to the movable barrier between the fourth wall and the fifth wall.

In some examples, the anchor system may further comprise at least one fastener configured to couple the guide lock and the bracket to the movable barrier.

Consistent with some examples, a movable barrier system having a barrier movable by a lift cable may comprise a rail extending horizontally with respect to the barrier, the rail having a first inner cavity at a first end of the rail and a second inner cavity at a second end of the rail, and an anchor system configured to be positioned at least partially in the first or second inner cavity. The anchor system may comprise a bracket comprising a first wall having a first hole, and a first flange extending from the first wall and having a first flange hole, the first hole and the first flange hole spaced by a first separation, a guide lock configured to be positioned at least partially in the bracket, and a pin configured to be positioned at least partially in the guide lock.

In some examples, the guide lock may be configured to slide within a guide track of the bracket to extend the pin across the first separation to secure the lift cable to the rail when the anchor system is positioned at least partially in the first inner cavity. The bracket may further comprise a second wall having a second hole, and a second flange extending from the second wall and having a second flange hole, the second hole and the second flange hole spaced by a second separation. The guide lock may be further configured to slide within the guide track of the bracket to extend the pin across the second separation to secure the lift cable to the rail when the anchor system is positioned within the second inner cavity.

In some examples, the movable barrier system may further comprise a spring pin configured to extend through a first spring pin hole in the guide lock and through a second spring pin hole in the pin to hole the pin in the guide lock. The movable barrier system may further comprise at least one fastener configured to fasten the guide lock and the bracket to an inner surface of the rail. The at least one fastener may be further configured to couple a roller tube to an outer surface of the rail.

Consistent with some examples, a method for installing or uninstalling a lift cable of a movable barrier system using an anchor system may comprise positioning the anchor system in an inner cavity of a rail of the movable barrier system. The anchor system may comprise a bracket comprising a first wall having a first hole and a second wall extending from the first wall and having a second hole, a guide lock positioned at least partially within the bracket, and a pin positioned in the guide lock. The method may further comprise moving the guide lock to extend or retract the pin through the first hole, through a loop of a lift cable disposed between the first wall and the second wall, and through the second hole to install or uninstall the lift cable.

In some examples, moving the guide lock to extend or retract the pin through the first hole may comprise sliding the guide lock within a guide track of the bracket. The method may further comprise a) fastening the guide lock and the bracket to the rail after extending the pin, b) unfastening the guide lock and the bracket from the rail prior to retracting the pin, or both a) and b).

Consistent with some examples, an anchor system with an integrated cable pin for securing or unsecuring a lift cable to a movable barrier may comprise a bracket attachable to the movable barrier, and a guide lock shaped to fit at least partially within the bracket, the guide lock configured to extend or retract the integrated cable pin with respect to the bracket to secure or unsecure the lift cable to the movable barrier.

In some examples, a) the lift cable may be secured or unsecured from the movable barrier without removing the integrated cable pin from the anchor system, b) the guide lock may extend or retract the integrated cable pin by moving within the bracket, or both a) and b).

BRIEF DESCRIPTION OF THE DRAWINGS

The accompanying drawings illustrate implementations of the systems, devices, and methods disclosed herein and together with the description, serve to explain the principles of the present disclosure.

Figure 1:
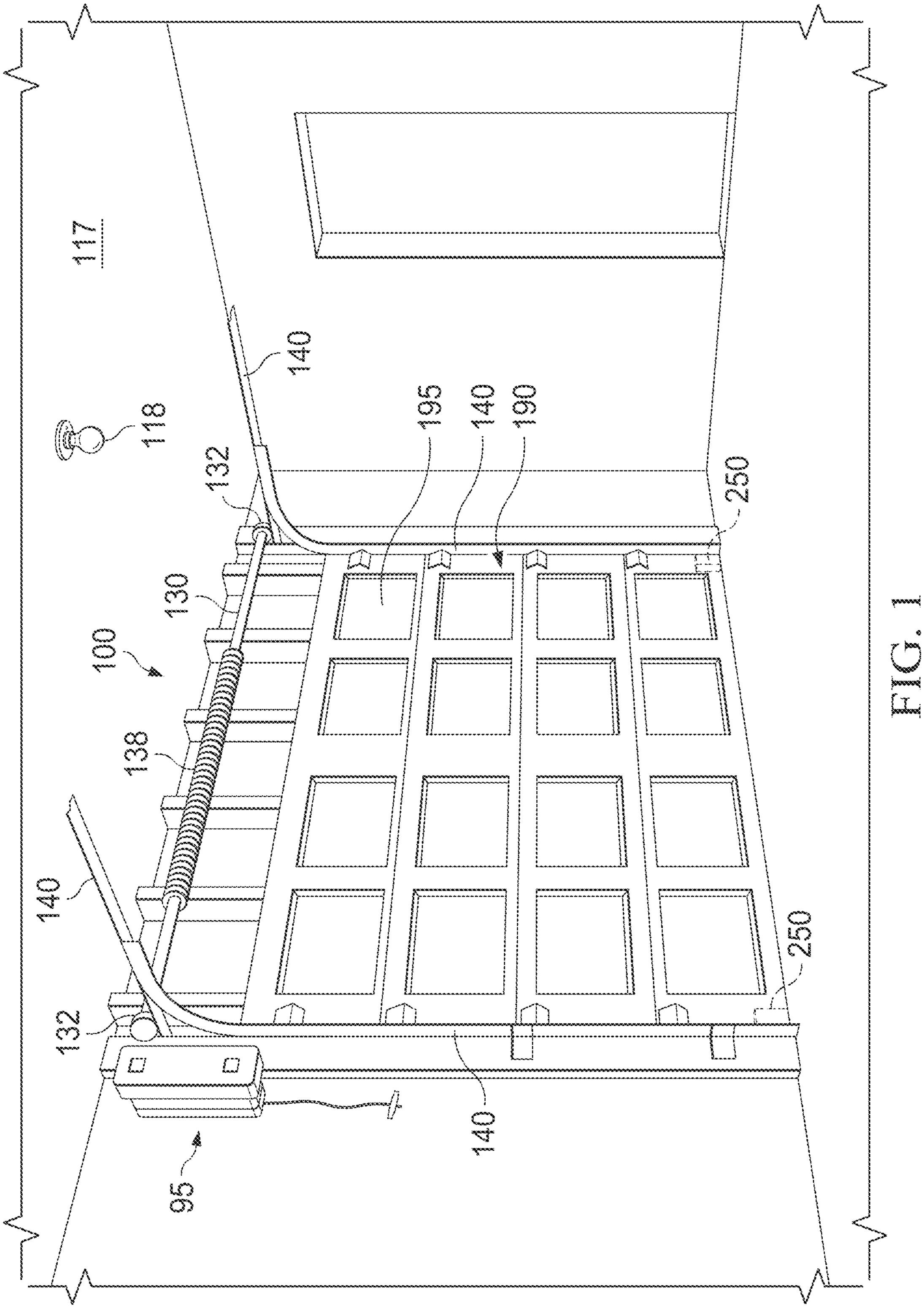
FIG. 1 is a perspective view of a movable barrier system, according to examples of the present disclosure.

These Figures will be better understood by reference to the following detailed description.

DETAILED DESCRIPTION

For the purpose of promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

In some examples, the present disclosure relates to a bracket and anchor system that are securely attachable to a movable barrier and can be simply connected to and disconnected from a lift cable. The anchor system may include a pin, a guide lock, and a spring pin that attaches the lift cable to the movable barrier. The bottom rail of the movable barrier may include two cavities at either end of the rail. Each of these cavities may be of a particular shape. The lower bracket may be sized and shaped with a profile matching the shape of the cavities of the rail. In this way, the lower bracket may be positioned within either of the cavities of the rail. The lift cable is attachable to the lower bracket. For example, the lower bracket may include two flanges on either side of the lower bracket, top and bottom or either end of the lower bracket, left and right. Each flange may include a hole aligned with another hole of the wall of the lower bracket.

Either before or after installation of the lower bracket within the cavity of the rail, a loop of the lift cable is placed between one of the flanges of the lower bracket and the wall of the lower bracket. A pin, whether integrated with the lower bracket or separate from the lower bracket is then placed through the hole of the flange, the loop of the lift cable, and the hole of the wall. The pin is positioned in a retainer of a guide lock that is positioned at least partially within the lower bracket. If the pin is integrated with the bracket by being already present within the lower bracket prior to installation of the lift cable, the direction of movement of the pin can be reversed and facilitated by sliding of the guide lock. In this direction of movement, the pin is extended through the hole in the wall, the loop of the lift cable, then the hole of the flange. A spring pin extends through both the guide lock and the pin, securing the two in place. The guide lock and lower bracket are fastened to the rail. When uninstalling or removing the lift cable from the anchor system, movement of the guide lock retracts the pin such that the pin is no longer extending through the lift cable. In this way, because the pin is integrated, the anchor system is capable of uninstalling and reinstalling the lift cable without disassembly. For example, without disintegrating the lift cable from the anchor system or the movable barrier.

In addition to the advantages described above, the examples described herein provide further advantages. For example, because the integrated pin extends through at least portions of the lower bracket and extends through a retainer of the guide lock within the lower bracket, because the lower bracket is placed within the cavity of the rail, and because the shape of the lower bracket corresponds to the shape of the rail, the weight of the movable barrier when the movable barrier is moved from an open position to a closed position is transferred from the lower bracket to the rail within the cavity of the rail itself, rather than through any fasteners securing the lower bracket to the rail. This configuration provides a much stronger connection between the lift cable and the movable barrier. In addition, because the lower bracket, along with the pin, the guide lock, and the spring pin are also positioned within the cavity, walls of the cavity of the rail contact the guide lock preventing the guide lock from being removed from the lower bracket. This, in turn, prevents removal of the pin and secures the lift cable in place. Furthermore, the guide lock can be secured to the walls of the cavity of the rail, further securing all of the components in place.

FIG. 1 is a perspective illustration of an example movable barrier system 100, according to examples of the present disclosure. In this example, the movable barrier is an upward acting garage door. In some examples, the movable barrier may be a sectional-type garage door. FIG. 1 illustrates a movable barrier 190 and a barrier operator 95. In some implementations, as shown in FIG. 1, the movable barrier 190 may include four sections 195 arranged vertically. The sections 195 may include various panels including opaque, transparent, or semi-transparent panels.

In some implementations, the movable barrier system 100 described herein may be referred to as a barrier system, a door system, a garage door system, a gate system, or any other similar term. In some implementations, the movable barrier 190 may be referred to as a barrier, a door, a garage door, a sectional garage door, an upward acting garage door, a gate, a movable gate, a sliding gate, or any other similar term. In some implementations, the barrier operator 95 may alternatively be referred to as an operator, a door operator, a garage door operator, a gate operator, an opener, a door opener, a garage door opener, a gate opener, a control system, or any other similar term. In some implementations, a light fixture 118 may be referred to as a light, a light system, or any other similar term.

FIG. 1 shows that the movable barrier 190 provides access to a space or a room having a ceiling 117 and the light fixture 118 that is spaced from the barrier operator 95. The movable barrier 190 may provide selective access to the space. The barrier operator 95 may be any suitable type of barrier operator. For example, in some implementations, the barrier operator 95 may be a jackshaft operator. In other implementations, the barrier operator 95 may be a direct drive wall or ceiling mounted operator, a belt driven operator, a chain driven operator, a screw drive operator, a trolley operator, a carriage operator, or any other type of barrier operator. The barrier operator 95 may include any suitable components. As shown in FIG. 1, the barrier operator 95 may be disposed adjacent the movable barrier 190. For example, in the implementation shown, the barrier operator 95 may be positioned on the same wall as the opening covered by the movable barrier 190. However, the barrier operator 95 may be positioned at any other location within the room shown in FIG. 1. For example, the barrier operator 95 may be affixed to the ceiling 117. In some implementations, the barrier operator 95 may be positioned on a different wall of the room or on the floor of the room. In some implementations, particularly in an implementation in which the barrier operator 95 is affixed or otherwise positioned on the ceiling 117 of the room, the light fixture 118 may be attached to, or a part of, the barrier operator 95.

Any suitable structures or components may be implemented to facilitate movement of the movable barrier 190 between a closed position and an open position. In the example shown in FIG. 1, the movable barrier 190 may be moved along one or more tracks 140. Additionally shown in FIG. 1 is a shaft 130, cable drums 132, and a torsion spring 138.

FIG. 1 illustrates the movable barrier 190 as an upward acting sectional door being movable between open and closed positions along the tracks 140. The tracks 140 may be affixed to either side of the opening of the movable barrier 190. In some implementations, the tracks 140 may be affixed to the wall of the room shown in FIG. 1 and/or the ceiling 117. In some implementations, the movable barrier 190 may include one or more rolling or sliding components on either side sized and shaped to fit within and move in a longitudinal direction along the tracks 140. The rolling or sliding components may be affixed to brackets positioned on either side of the movable barrier 190.

Components of the movable barrier system 100 shown in FIG. 1 may include any other suitable components. For example, the movable barrier system 100 may include rollers positioned on the movable barrier 190 or the tracks 140. The movable barrier system 100 may include sensors, such as safety sensors configured to detect the presence or motion of an object or person, seals positioned along any portion of the movable barrier 190 or the corresponding opening, tracks, lift cables, or tube shafts. The system may include extension springs to further reduce necessary rotational force of a motor, a motor rail, belts, motor head, motor arms, lift handles for manual operation, emergency release ropes, or any other suitable components.

FIG. 1 additionally includes a view of two lower brackets 250 positioned within the movable barrier 190. For example, a left lower bracket 250 may be positioned within the movable barrier 190 at a left lower corner of the movable barrier 190. Similarly, a right lower bracket 250 may be positioned within the movable barrier 190 at a right lower corner of the movable barrier 190. As will be explained in more detail hereafter, the left and right lower brackets 250 may be positioned within a bottom rail of the movable barrier 190. The lower brackets 250 may be shaped to fit within a rail 210. In some examples, lift cables may be positioned on either side of the movable barrier 190 and affixed to flanges of each of the lower brackets 250. The lower brackets 250 may provide a stronger connection between the lift cables and the movable barrier 190. In addition, the lower brackets 250 may be identical and, therefore, interchangeable. That is, the left lower bracket 250 may be used as the right lower bracket 250 and vice versa. Because the lower brackets 250 are identical, fewer unique parts are required for the assembly of the movable barrier system 100, reducing manufacturing and inventory costs and complexity.

Figure 2:
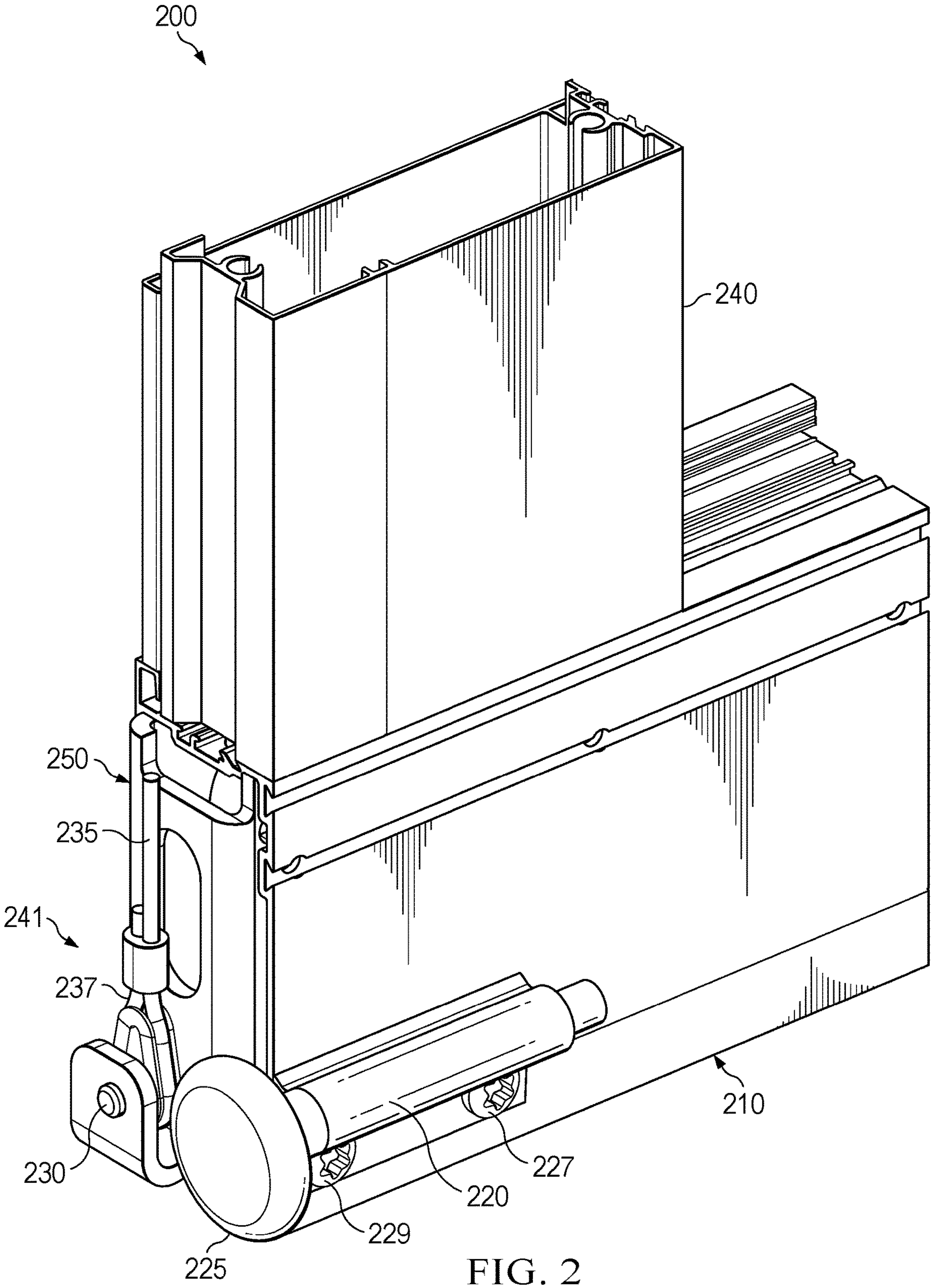
FIG. 2 is a perspective view of a lower bracket assembly of a movable barrier, according to examples of the present disclosure.

FIG. 2 is a perspective view of a lower bracket assembly of a movable barrier, according to examples of the present disclosure. As shown in FIG. 2, the lower bracket assembly 200 may be positioned at a lower region of the movable barrier 190. The movable barrier 190 may include two or more lower bracket assemblies 200. For example, a lower bracket assembly 200 may be positioned at a lower region on one side of the movable barrier 190 while another lower bracket assembly 200 is positioned at a lower region of another side of the movable barrier. The lower bracket assembly 200 shown in FIG. 2 may correspond to a left lower bracket assembly 200. The left lower bracket assembly 200 may include or engage with a left side of the rail 210 shown in FIG. 2. Similarly, a right lower bracket assembly may be positioned next to or affixed to a right side of the rail 210. Such a configuration may be illustrated in FIG. 1.

The lower bracket assembly 200 includes an anchor system 241 which may include a lower bracket 250, a bolt or pin 230 couplable to the lift cable 235 including a lower loop 237, a guide lock 410 (not shown in FIG. 2), and a spring pin 411 (not shown in FIG. 2), a roller holder 220, and a roller 225, among other components. For example, the anchor system 241 may be used in combination with fasteners 229, 227, depending on the way in which the anchor system 241 is secured to the rail. The lower loop 237 may be fit over a support. The support may be made of a metal or any other material suitable resistant to degradation. The support maintains the lower loop 237 in a predetermined orientation and acts as protect the lift cable 235 against the friction and stresses applied by the pin 230 when the movable barrier 190 is raised or lowered. FIG. 2 additionally depicts the left portion of the rail 210, as well as a stile 240.

Referring again to FIG. 1, the movable barrier 190 may be moved between an open position and a closed position by operation of the barrier operator 95. In some examples, the barrier operator 95 may turn the cable drums 132 to cause movement of the movable barrier 190. For example, the barrier operator 95 may rotate the cable drums 132 to lift and/or lower the movable barrier 190. A lift cable, such as the lift cable 235 shown in FIG. 2, may be positioned or wrapped around cable drum 132. For example, the movable barrier 190 may be affixed to two cables 235 on a left side and a right side of the movable barrier 190. Each of these lift cables 235 may be affixed to a corresponding cable drum 132. To lift the movable barrier 190 from a closed position to an open position, the barrier operator 95 may turn the shaft 130 thus turning each lift cable 235 around the corresponding cable drum 132 producing an upward acting force on each lift cable 235. Because each lift cable 235 is affixed to a corresponding lower bracket of the movable barrier 190, the movable barrier 190 may move upward along the tracks 140 as the lift cables 235 on either side of the movable barrier 190 are wrapped around the rotating cable drums 132.

In some examples, as shown in FIG. 2, the lower bracket assembly 200 may provide additional strength to the connection between the lift cable 235 to the lower region of the movable barrier 190 (e.g., the rail 210 shown). As shown in FIG. 2, the lower loop 237 formed in a lower end of the lift cable 235 may receive the pin 230. In this way, the pin 230 may secure the lift cable 235 to the lower bracket 250. In some examples, the pin 230 may additionally be referred to as a cable pin, a bolt, a bar, a latch bolt, a cable lock, or any other suitable name. In FIG. 2, the pin 230 is integrated in the lower bracket assembly 200 and the anchor system 241. The lower bracket 250 may be affixed to the movable barrier 190.

Typically, movable barriers may be affixed to a lift cable by corresponding lower brackets with one or more fasteners, such as the fasteners 227 or 229. In such a configuration, the upward acting force provided by the barrier operator moving the lift cables in an upward direction may be transferred to the movable barrier through the fasteners alone. In such a configuration, the attachment of the lift cables to the movable barrier may be prone to failure due to weak fasteners or wear caused by attaching the fasteners to the movable barrier and/or the lower bracket. In this way, the overall strength of the connection of the lift cable to the movable barrier is decreased.

In the implementation of the lower bracket assembly 200 shown in FIG. 2, however, the upward acting force provided by the barrier operator 95 on the lift cable 235 is transferred to the movable barrier 190 within the rail 210 because the lower bracket 250 is positioned within the rail 210. As will be explained in more detail with reference to a FIG. 3, a top surface of the lower bracket 250 may contact or mate with an inner surface of the cavity defined by the rail 210. In this way, as the lift cable 235 is moved upward this force is transferred through the pin 230 to the lower bracket 250 and to the rail 210, due to the relative positions of each of these components. In this way, no fasteners bear the weight of the movable barrier 190 alone. Rather, the weight of the movable barrier 190 as it is moved from a closed position to an open position is supported within the rail 210 of the movable barrier 190 itself. Because the examples described herein allow the pin 230 to be integrated with the anchor system, and because the pin 230 extends far into, and in some examples, all the way through the lower bracket, the forces can be evenly distributed through the lower bracket and into the rail 210.

In some examples, as shown in FIG. 2, the roller 225 may be positioned within the left track 140 shown in FIG. 1. The fasteners 227 and 229 may be positioned through corresponding holes within the roller holder 220 as well as through corresponding holes within the rail 210, the lower bracket 250, and the guide lock 410. In some examples, the fasteners 227 and 229 may affix the roller holder 220, and subsequently the roller 225, to the movable barrier 190 as the movable barrier 190 is moved between a closed position and an open position. The roller 225 may prevent movement of the movable barrier 190 in directions perpendicular to the track 140. However, because the weight of the movable barrier 190 is supported by the lower bracket 250 within the rail 210, the roller holder 220 and corresponding fasteners 227 and 229 may not bear the weight of the movable barrier 190 itself but only prevent perpendicular movement of the movable barrier 190.

Figure 3:
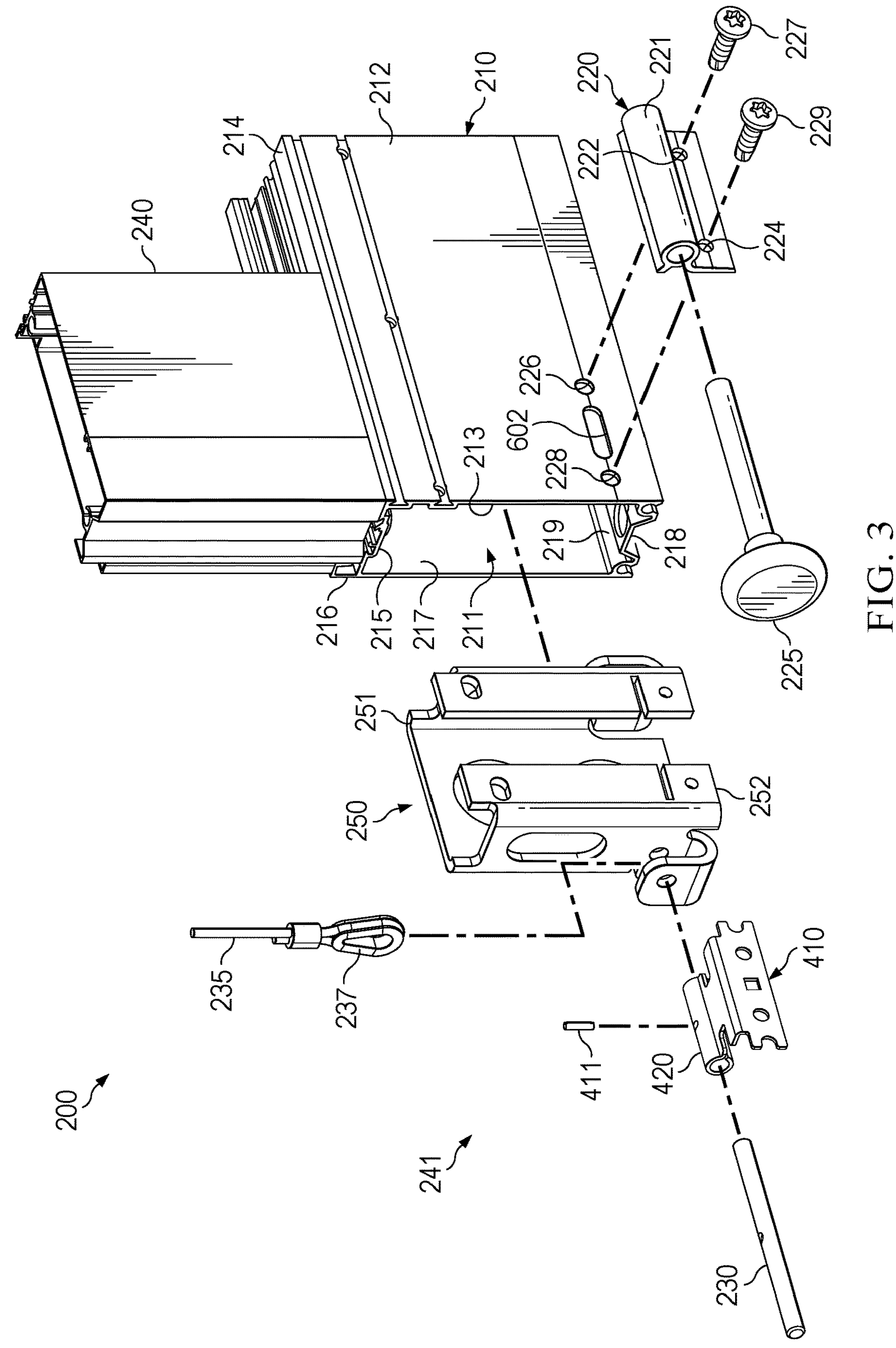
FIG. 3 is an exploded perspective view of a lower bracket assembly of a movable barrier, according to examples of the present disclosure.

FIG. 3 is an exploded perspective view of the lower bracket assembly 200 of the movable barrier 190, according to examples of the present disclosure. FIG. 3 provides additional details of the lower bracket assembly 200 as will be explained.

During setup of the movable barrier system 100 (FIG. 2), the lower bracket 250 may be positioned within a left cavity 211 of the rail 210. In some examples, and as shown in FIG. 3, the left cavity 211 may be defined by multiple inner surfaces of the rail 210. For example, the rail 210 may include at least four walls. The rail 210 may include an inner wall 212, an upper wall 214, an outer wall 216, and a lower wall 218. The left cavity 211 formed within the left end of the rail 210 may be at least partially defined by an inner surface 213 of the inner wall 212, an inner surface 215 of the upper wall 214, an inner surface 217 of the outer wall 216, and an inner surface 219 of the lower wall 218.

An upper surface 251 of the lower bracket 250 may be of a profile that matches the profile of the inner surface 215. Similarly, a lower surface 252 of the lower bracket 250 may be of a profile that matches the profile of the inner surface 219. In this way, surfaces of the lower bracket 250 may mate with corresponding surfaces of the rail 210. During setup, the lower bracket 250 may be slid in a direction parallel to the rail 210 into the left cavity 211 of the rail 210. In an assembled configuration, such as the one shown in FIG. 2, surfaces of the lower bracket 250 may contact any of the inner surfaces 213, 215, 217, and/or 219 shown in FIG. 3. As described, the upper surface 251 may be a bearing surface. Similarly, the corresponding inner surface 215 of the rail 210 may be a bearing surface. For the purposes of this disclosure, a bearing surface may be a surface of any component of the movable barrier system 100 which transfers a mechanical force or stress from one component to another. In this way, the upper surface 251 of the lower bracket 250 may transfer an upward acting force imposed on the lower bracket 250 by the lift cable 235 to the inner surface 215 of the rail 210. In this way, the lower bracket 250 may be configured to distribute loads applied to the pin 230 to the rail 210 when the movable barrier 190 is lifted or lowered.

FIG. 3 additionally shows an exploded view of the roller 225, the roller holder 220, and corresponding components. For example, the roller holder 220 may be affixed to the rail 210 by the fasteners 227 and 229. Holes 222 and 224 may extend through the roller holder 220. Corresponding holes 226 and 228 may extend through the inner wall 212 of the rail 210. In some examples, as will be described in greater detail with reference to FIG. 4, additional holes may be positioned within the lower bracket 250 to receive the fasteners 227 and 229. The fasteners 227 and 229 may be positioned respectively within the holes 222 and 224, and the holes 226 and 228 securing the roller holder 220 to the rail 210. The roller holder 220 may include a roller tube 221. The roller tube 221 may include an inner lumen sized and shaped to receive a cylindrical portion of the roller 225. As described with reference to FIG. 2, the roller 225 and corresponding roller holder 220 may prevent movement of the movable barrier 190 from the track 140.

Figure 4:
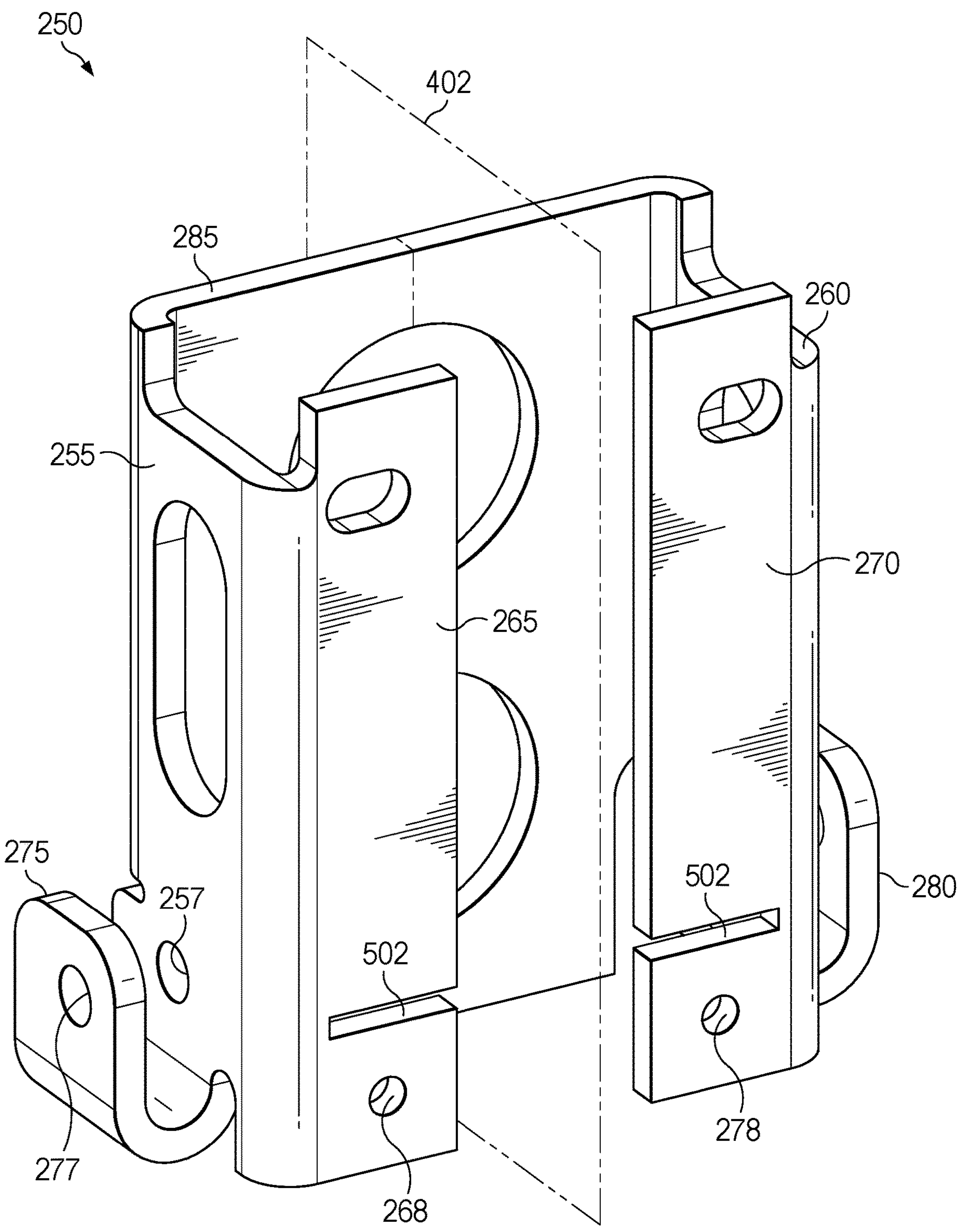
FIG. 4 is a perspective view of a lower bracket of a movable barrier, according to examples of the present disclosure.

FIG. 4 is perspective view of a lower bracket 250 of a movable barrier, according to examples of the present disclosure. FIG. 4 shows the front side of the lower bracket 250 described below. The lower bracket 250 shown in FIG. 4 may include a rear wall 285, a left wall 255, a right wall 260, and a front wall 265, and a front wall 270. The front wall 265 and the front wall 270 may be a singular wall. The front wall 265 may extend obliquely relative to the left wall 255 and the front wall 270 may extend obliquely relative to the right wall 260. As shown in FIG. 4, a flange 275 may extend from the left wall 255. For example, as shown in FIG. 4, the flange 275 may be affixed to a lower portion of the left wall 255. In some examples, the flange 275 and the left wall 255 may be parts of a unitary structure. In some examples, each wall or component of the lower bracket 250 may be parts or components of the same unitary structure. The flange 275 may be any other suitable shape or size. Additionally, the flange 275 may be connected to the left wall 255 in more than one location. For example, the flange 275 may be connected on all or some of its sides, leaving an opening in the top of the flange for the lift cable 235 to pass through.

In some examples, the flange 275 may include a hole 277. A corresponding hole 257 may be positioned within the left wall 255. The flange 275 may be spaced from the left wall 255 such that the lift cable 235, described with reference to FIGS. 2 and 3, may be positioned between the flange 275 and the left wall 255. In this way, the flange 275 may be offset from the wall 255 so as to create a space between the flange 275 and the left wall 255. As previously described, the hole 277 and the hole 257 may be aligned such that each of these holes 277 and 257 may receive the pin 230 therethrough. The pin 230, the guide lock 410, the spring pin 411, the holes 277 and 257, and the flange 275 or the left wall 255 may be referred to as the anchor system 241 of the lower bracket 250 since the lift cable 235 may anchor to the lower bracket using these features or using other anchor-like attachment features. The anchor system 241 need not include all of these features and may include additional features, in some examples. The anchor system 241 may be any element projecting from the lower bracket for anchoring (e.g., connecting, disconnecting, installing, uninstalling, securing, etc.) to the lift cable 235.

In some examples, the holes 268 and 278 may receive fasteners, such as the fasteners 227 and 229 described with reference to FIGS. 2 and 3. The holes 268 and 278 may be threaded so as to mate with threads of the fasteners 227 and 229. In other examples, the fasteners 227 and 229 may be affixed to other receiving components, such as nuts, positioned within an inner region of the lower bracket 250. In this way, the holes 268 and 278 may align with corresponding holes within the rail 210 on both a left and a right side of the rail 210, the holes within the roller holder 220, and the holes within a guide lock 410.

As shown in FIG. 4, the lower bracket 250 may be symmetrical about a central plane 402 splitting the lower bracket into two halves. The boundary of the plane 402 splitting the lower bracket into two halves is represented on the bracket by the dashed lines. For example, a flange 280 may be positioned extending from a lower region of the right wall 260. The flange 280 may be substantially similar to the flange 275 previously described. For example, the flange 280 may include a hole which is aligned with a corresponding hole within a lower region of the right wall 260. Like the flange 275 described previously, the flange 280 may create a space between the hole within the flange 280 and the hole within the right wall 260. A loop or other securement feature of a lift cable, such as the lift cable 235 positioned on a right side of the movable barrier 190 may be positioned within this space between the flange 280 and the right wall 260. A similar pin 230 may be positioned through each of the holes within the flange 280 and the right wall 260. A similar guide lock 410 may secure the pin 230 to the lower bracket 250. In this way, the same lower bracket 250 may be used to affix a left lift cable to a left lower side of the movable barrier 190 or may be used to affix a right lift cable to a right lower side of the movable barrier 190. In some examples, during setup of the movable barrier system 100, two lower brackets 250 may be provided. One lower bracket 250 may be used within a left cavity of the rail 210, as shown and described with reference to FIGS. 2 and 3, and a second lower bracket 250 may be used within a right cavity of the rail 210. Because the lower bracket 250 is symmetrical, or, in other words, ambidextrous, fewer unique components are required for the assembly or servicing of the movable barrier system 100. Because fewer unique components are used in the movable barrier system 100, manufacturing costs of the movable barrier system 100 may be decreased. In addition, inventory complexity may be decreased.

In some examples, the lower bracket 250 may not be symmetrical, may be symmetrical about a transverse plane only, or may be symmetrical about a longitudinal plane only. In these instances, the lower bracket 250 may still be usable in both the right and left side of the movable barrier 190. For example, if the lower bracket 250 has only one flange, the lower bracket 250 may be flipped in opposite directions such that the flange of the lower bracket 250 extends from the right or left side of the movable barrier 190.

Figure 5:
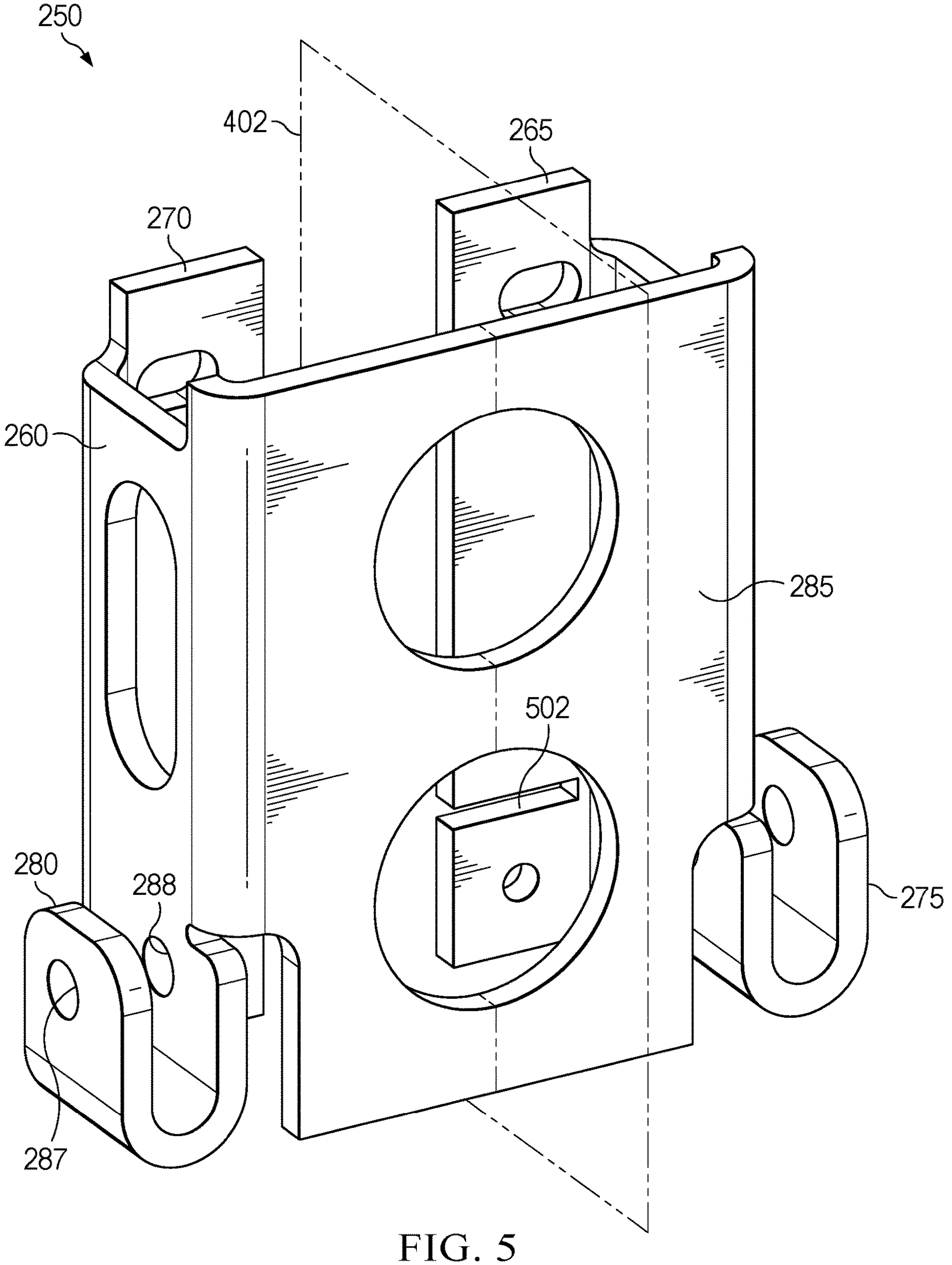
FIG. 5 is a perspective view of a lower bracket of a movable barrier, according to examples of the present disclosure.

FIG. 5 is a perspective view of a lower bracket of a movable barrier, according to examples of the present disclosure. FIG. 5 shows the rear side of the lower bracket 250. The plane 402 splits the lower bracket into two halves. The boundary of the plane 402 splitting the lower bracket into two halves is represented on the bracket by the dashed lines. FIG. 5 shows the flange 280 including a hole 287. The right wall 260 may additionally include a hole 288. The holes 287 and 288 may be aligned so as to receive the pin 230. Like the flange 275 previously described, the flange 280 may provide a separation between the right wall 260 and the flange 280 into which a lift cable, such as the lift cable 235, may be positioned.

Figure 6:
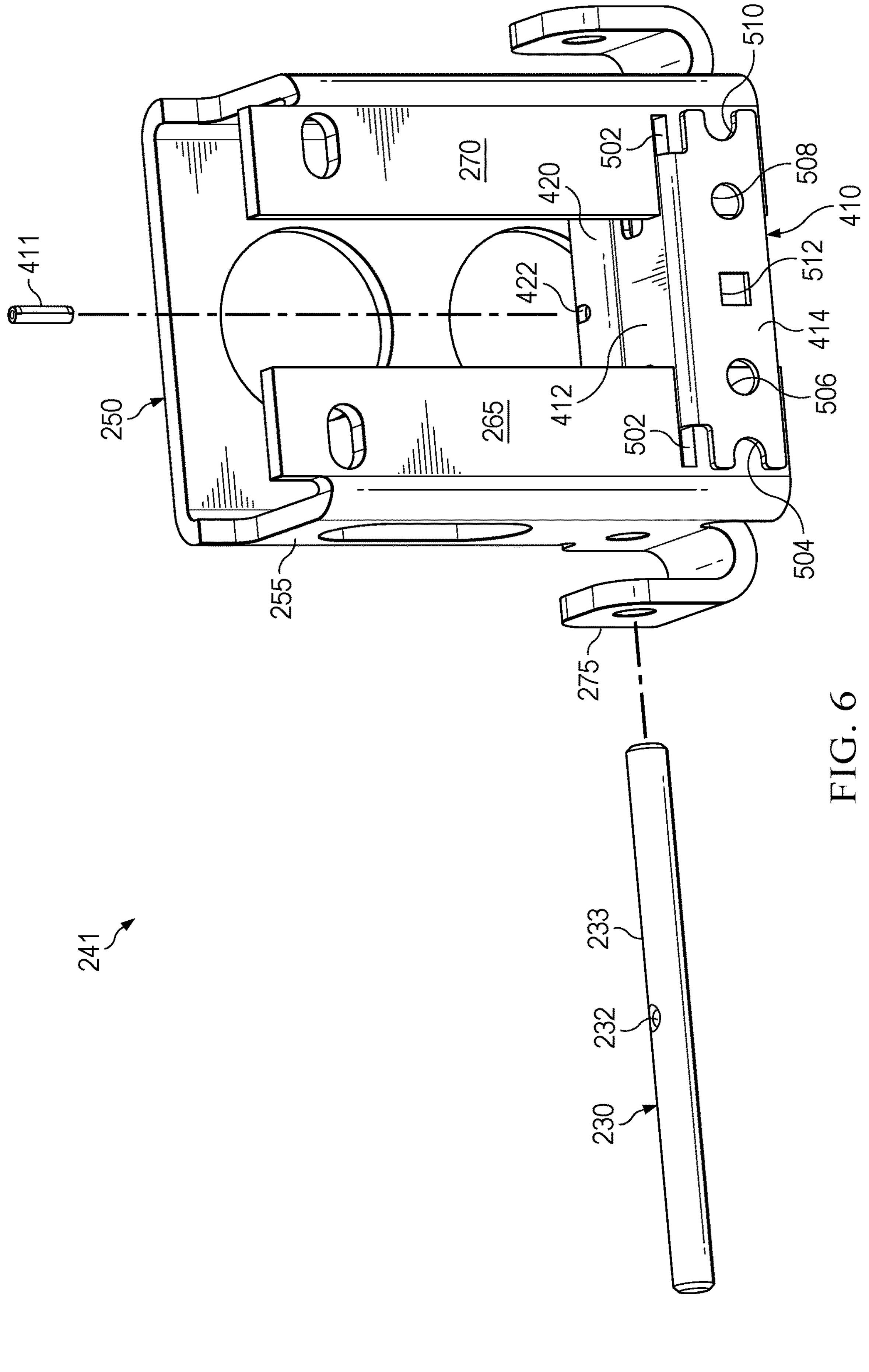
FIG. 6 is a partially-exploded perspective view of an anchor system of a movable barrier, according to examples of the present disclosure.

FIG. 6 is a partially-exploded perspective view of an anchor system, according to examples of the present disclosure. The pin 230 may include a shaft 233. In some examples, the a head (not shown) of the pin 230 may be attached to the pin 230 after the pin 230 is extended through the lift cable 235 and across the separation formed between a flange and a wall of the lower bracket 250. In some examples, the head of the pin 230 may not be necessary or desired since the pin 230 can be retained from extending “forward” or “backward” in the holes of the lower bracket 250 due to the guide lock 410 and the spring pin 411. The head may have a diameter that is larger than the diameter of the shaft of the pin 230 to prevent motion of the pin 230. In this way, the head may function as an additional restraint to keep the lift cable 235 secured to the lower bracket 250.

In some examples, a cross-sectional shape of the pin 230 may be a circle. In other examples, the cross-sectional shape may be any other suitable shape. In some examples, a diameter of a cross-section of the pin 230 may correspond to a diameter of a cross-section of the holes 257, 277, 287, and 288 of the lower bracket 250 described with reference to FIGS. 4 and 5. Similarly, the diameter of the cross-section of the pin 230 may correspond to a diameter of a cross-section of a retainer 420 of the guide lock 410. In some examples, the retainer 420 may additionally be referred to as a sleeve, an integrator, a slot, a pin retainer, or any other suitable term.

In some examples, the guide lock 410 may additionally be referred to as a guide bracket, a retaining lock, a retainer clip, a retaining clip, a clip, or by any other suitable term. In some examples, the guide lock 410 is shaped to fit at least partially within the lower bracket 250. In some examples all of the guide lock 410 is contained within the lower bracket 250, while in other examples, all of the guide lock 410 may be located outside of the lower bracket 250. The guide lock 410 is movable relative to the lower bracket 250 between a position where the lift cable 235 is couplable to the pin 230 and a position where the lift cable 235 is uncouplable from the pin 230. In this way, the guide lock is configured to displace the pin when moving between these positions. As shown in FIG. 6, the guide lock 410 may include the retainer 420 configured to receive the pin 230, an inner portion 412, and an outer portion 414. The inner portion 412 is positioned inside of the lower bracket 250 while the outer portion 414 is positioned outside of the lower bracket 250. The inner portion 412 may be a formed plate that extends in a substantially perpendicular direction from the outer portion 414. The inner portion 412 may therefore define a plate that is substantially perpendicular with the front wall(s) 265, 270 of the lower bracket 250. The inner portion 412 or plate may extend outwards from the retainer 420. The retainer 420 may be a part of the inner portion 412 or the outer portion 414, or may be a separate feature. In some examples, the retainer 420 is a hole or collar of the inner portion 412, which functions as the retainer 420. The retainer 420 may be longer or shorter than is shown in FIG. 6, for example, the retainer 420 may be shorter in length than other parts of the inner portion 412. In the example shown, the retainer 420, the inner portion 412, and the outer portion 414 are one unitary structure.

In some examples, the outer portion 414 may be a formed plate that extends in a substantially perpendicular direction from the inner portion 412. The outer portion 414 may therefore define a plane that is parallel with the front wall(s) 265, 270 of the lower bracket 250. In some examples, a length of the outer portion or plate 414 may be greater than a length of the inner portion 412. The diameter of the cross-section of the retainer 420 may correspond to an outer diameter of the pin 230. In this way, the pin 230 may be insertable through the retainer 420 of the guide lock 410. The diameter of the cross-section of the pin 230 may be smaller than the outer diameter of the pin 230 to allow the pin 230 to slide within the retainer 420 during setup.

During setup, the pin 230 may be slid through the retainer such that a spring pin hole 232 aligns with a spring pin hole 422 in the guide lock 410. The spring pin hole 232 may be positioned at any point along the shaft of the pin 230. The spring pin hole 422 may be positioned anywhere on the guide lock 410. In some examples, as shown in FIG. 6, the spring pin hole 422 extends through at least one wall of the retainer 420. Once the spring pin hole 232 and the spring pin hole 422 align, the spring pin 411 may be inserted therethrough to hold the pin 230 in the retainer 420 of the guide lock 410. In this regard, the spring pin 411 is configured to extend through the spring pin hole 232 and the spring pin hole 422 to hole the pin 230 in the retainer 420 of the guide lock 410. In some examples, multiple spring pin holes 232 can be placed in the pin 230 and multiple spring pin holes 422 can be placed in the guide lock 410 to allow the pin 230, the guide lock 410, and the spring pin 411 to be usable with lower brackets of varied sizes. The spring pin 411 ensures that the pin 230 stays in the desired location with respect to the lower bracket.

In some examples, the lower bracket 250 includes a guide track 502. The guide track 502 may be formed by the walls of the lower bracket 250. The guide track 502 can be formed in other walls of the lower bracket 250 besides the front wall(s) 265, 270 as shown. The guide track 502 may allow the guide lock 410 to slide with respect to the lower bracket 250 and the rail 210 to extend or retract the pin 230 to install or uninstall the lift cable 235. As shown in FIG. 6 and FIG. 4, the guide track 502 may have a first portion formed by a first portion of the front wall 265 and a second portion formed by a second portion of the front wall 270. Both portions of the guide track 502 are aligned and configured to receive the guide lock 410. When the guide lock 410 slides within the first portion of the guide track 502 to a position, the lift cable 235 may be secured to the movable barrier 190 between the left wall 255 and the flange or wall 275. When the guide lock 410 slides within the second portion of the guide track 502 to a position, the lift cable 235 may be secured to the movable barrier 190 between the right wall 260 and the flange or wall 280. The guide track 502 as well as the positional relationships of the pin 230, the guide lock 410, and the lower bracket 250 during various stages of installation and uninstallation will be explained further below with respect to FIGS. 8A-8C. As noted herein, moving the guide lock 410 laterally along the guide track 502 also laterally moves the retainer 420. This also carries the pin 230 laterally. In some examples, the retainer 420 is movable by other methods than sliding the guide lock 410 through the guide track 502. For example, the retainer 420 itself may move with respect to the guide lock 410, while the guide lock 410 remains stationary with respect to the lower bracket 250.

Figure 7:
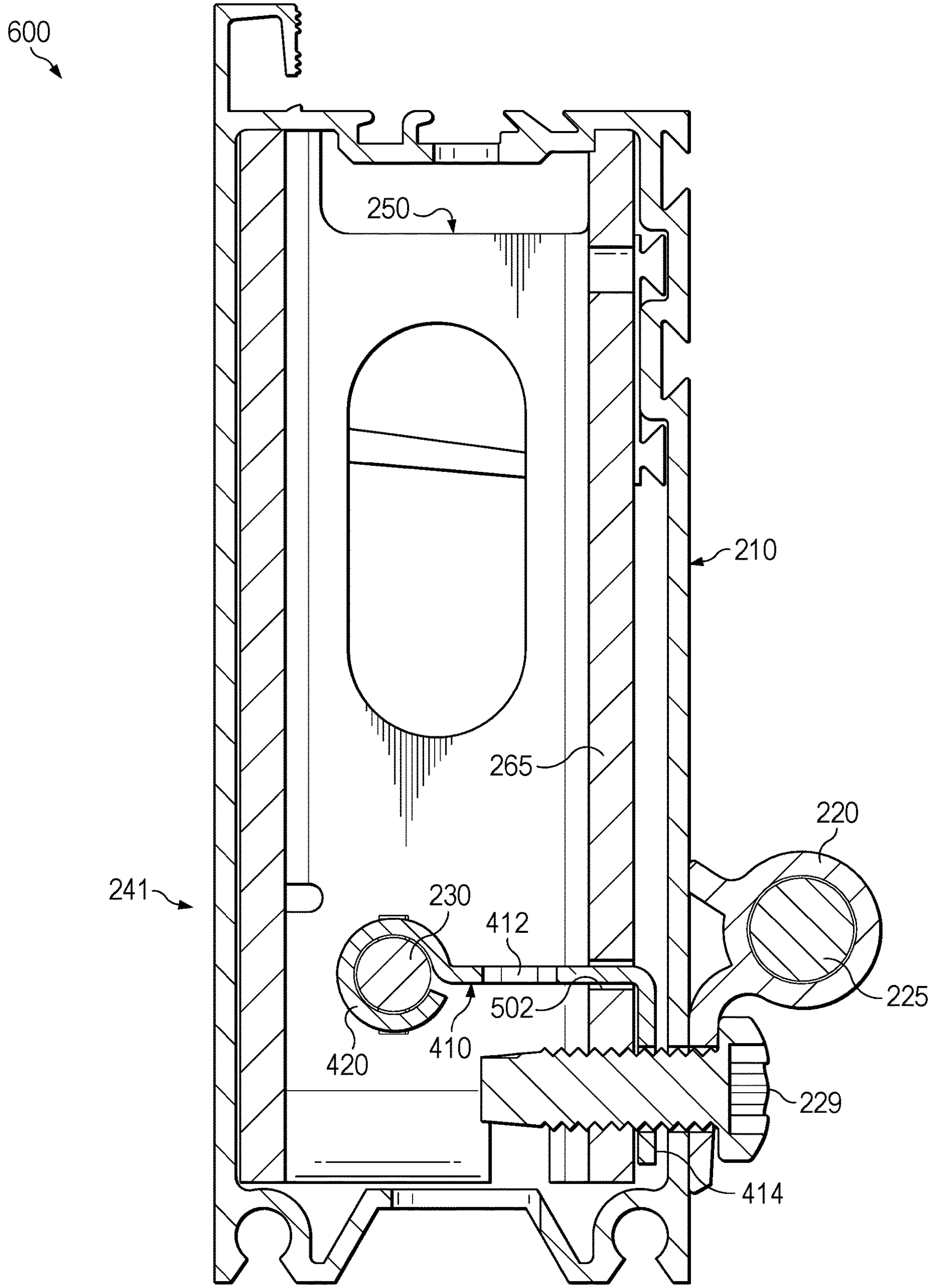
FIG. 7 is a cross-sectional side view of an anchor system of a movable barrier, according to examples of the present disclosure.
Figure 8A:
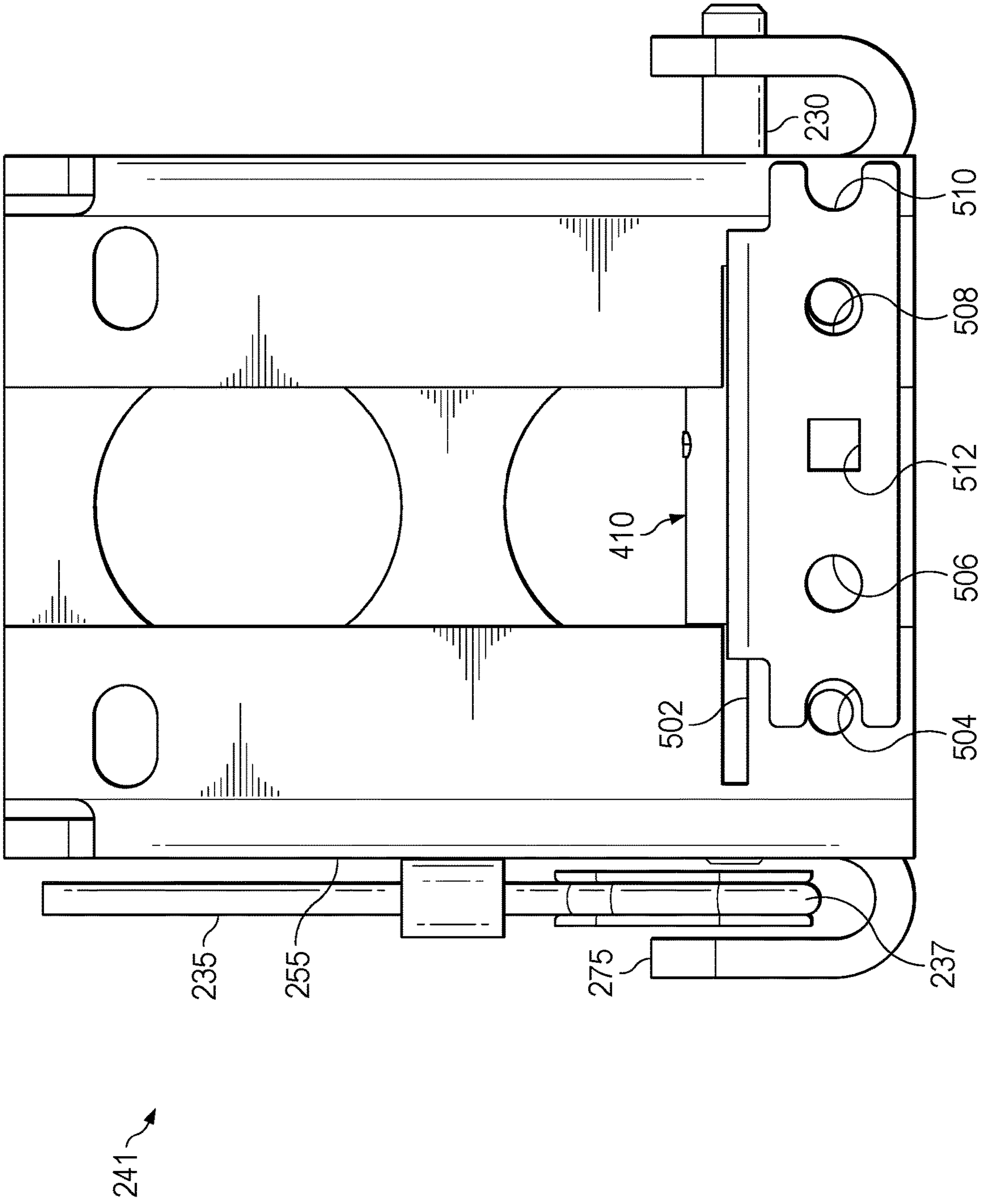
FIG. 8A is a front view of an anchor system of a movable barrier, according to examples of the present disclosure.
Figure 8B:
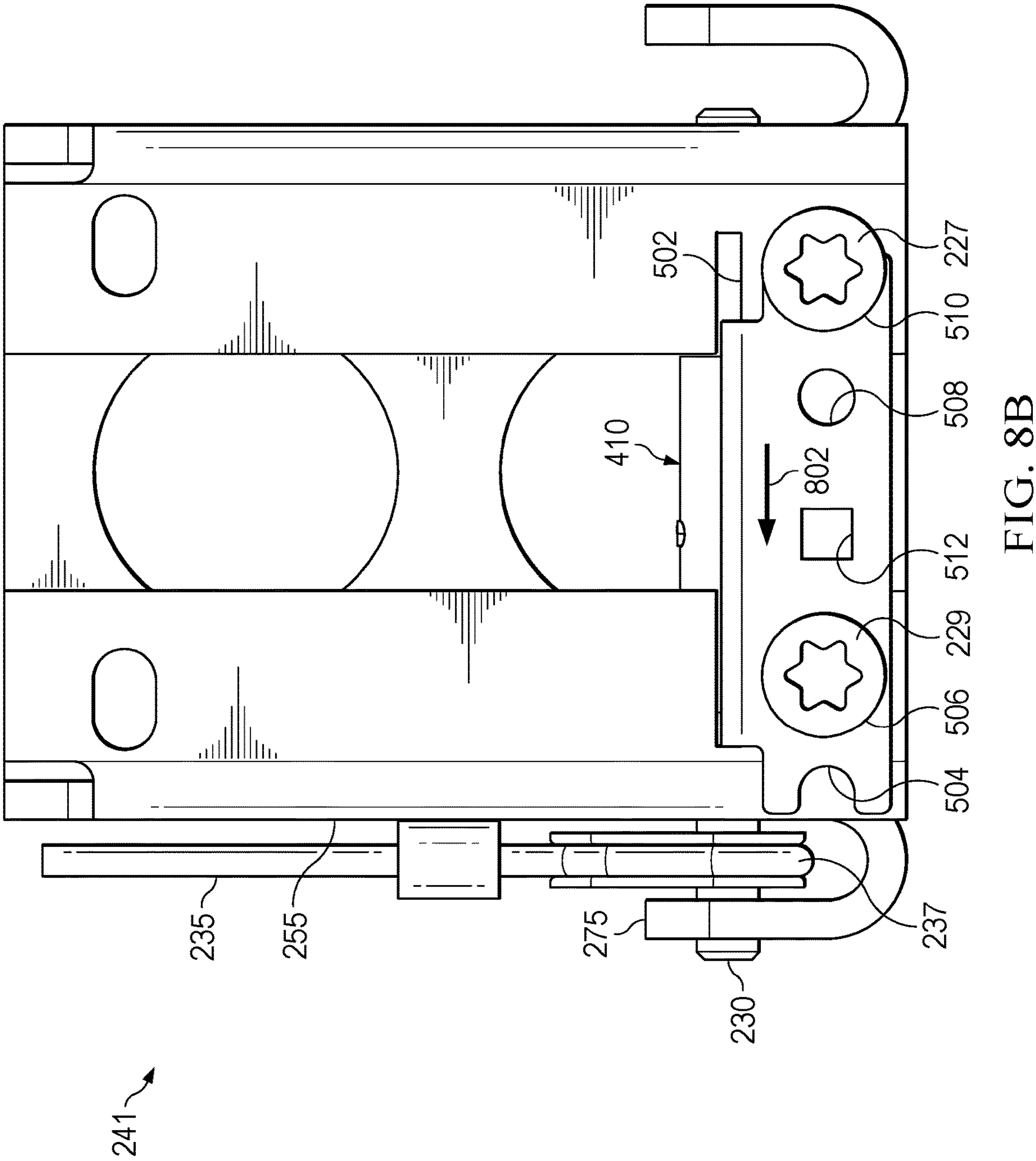
FIG. 8B is a front view of an anchor system of a movable barrier, according to examples of the present disclosure.
Figure 8C:
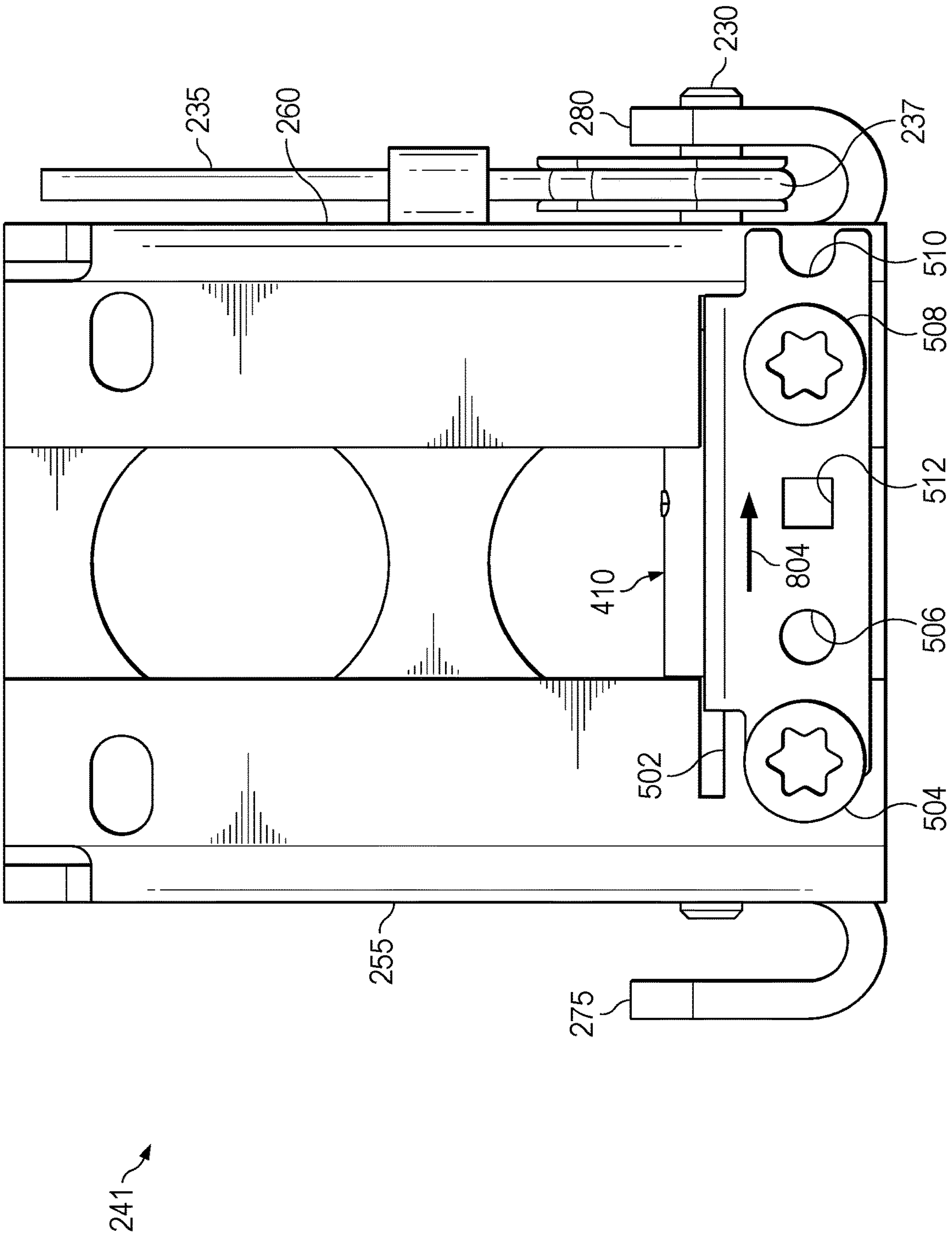
FIG. 8C is a front view of an anchor system of a movable barrier, according to examples of the present disclosure.

During installation and uninstallation, the guide lock 410 can be fastened to the lower bracket 250 using fasteners. In some examples, fasteners 229 and/or 227, may fasten the roller holder 220 to the lower bracket 250 and to the rail 210. As shown in FIG. 7, the fasteners may also be used to fasten the guide lock 410 to the rail 210 and the lower bracket 250. The fasteners may extend through any of the holes 504, 506, 508, or 510 in the guide lock 410, which are aligned with the holes 268 and/or 278 in the lower bracket 250. In FIG. 6, the guide lock 410 is positioned in a centered position with respect to the guide track 502 such that none of the holes 504, 506, 508, and 510 align with the holes 268 and/or 278 in the lower bracket. FIGS. 8A-8C show the holes aligned during various stages of installation and uninstallation, which allow for fastening to occur.

In some examples, the guide lock 410 includes an actuator 512 used for sliding the guide lock 410 within the guide track 502. The guide lock 410 can be slid laterally within the guide track 502 to positions where the pin 230 projects and/or retracts in and out of one or both sides of the lower bracket 250. In some examples, the actuator 512 is an aperture or indent. The aperture or indent can align with a lock access hole 602 (shown in FIG. 3). The lock access hole 602 allows a user to access the guide lock 410 through the rail 210. The lock access hole 602 may be formed by any part of the rail 210 including a sidewall of the rail as shown. In some examples, the lock access hole 602 aligns with a gap between the front walls 265, 270 of the lower bracket 250. In some examples, where the guide track 502 is not split into multiple portions due to the gap in the front walls 265, 270, the lock access hole 602 may align with the guide track 502.

Because the lock access hole 602 and the actuator 512 align, an operator can insert, a bar, a lever, or other mechanism (not shown) into both the actuator 512 in the guide lock 410 and the lock access hole 602 in the rail 210 and apply a force to the guide lock 410 to make the guide lock 410 slide within the guide track 502. The guide lock 410 moves with respect to both the lower bracket 250 and the rail 210. In some examples, the lock access hole 602 may be conjoined with the hole 228 and 226, forming one hole used both for fastening the anchor system 241 and allowing access through the rail 210 to the guide lock 410.

In some examples, the profile of the handle may correspond to the profile of the actuator feature 512 to allow the handle to apply force efficiently and securely (without dislodging) to the actuator 512. In some examples, the actuator 512 can be of any suitable shape and need not be an aperture. For example, the actuator 512 can be a tab that sticks outwards towards the operator. In some examples, the actuator 512 can include a spring loaded or other tensioned setup such that the user need only push a button or release a connection to make the guide lock 410 slide one direction or another to extend or retract the pin 230. In some examples, the actuator 512 can be a powered actuator, such as an electric motor, to provide automation or powered control. In some examples, the actuator 512 can include non-electric drivers, such as magnets. For example, the guide lock 410 itself could be magnetic and an operated could use an attracting or opposing magnetic fields to move the guide lock 410 and extend or retract the pin 230.

FIG. 7 is a cross-sectional side view 600 of an anchor system of a movable barrier, according to examples of the present disclosure. As shown, the pin 230 is extended through the retainer 420. The retainer 420 merges with the inner portion 412 which extends inside of the lower bracket 250 and through the guide track 502. The inner portion 412 merges with the outer portion 414, which extends substantially perpendicular to the inner portion 412 and runs in parallel with the front wall 265. The outer portion 414 may lay flat against the front wall 265 to allow the fasteners 229, 227 to fasten the guide lock 410 to the lower bracket 250. Fastening the guide lock 410 to the lower bracket 250 prevents movement of the guide lock 410, the pin 230, and the spring pin 411 with respect to the lower bracket 250. How the fasteners 229, 227 fasten the guide lock to the lower bracket 250 will be discussed further below with respect to FIGS. 8A-8C.

FIG. 7 additionally shows the fastener 229 fastening the roller holder 220 to the rail 210. The roller 225 is positioned in the roller holder 220. The fasteners 229 and 227 may extend through the roller holder 220, the guide lock 410, the rail 210, and the lower bracket 250, securing all of the components in place. The fasteners 229 and 227 can fasten any or all of the components together. In some examples, the fasteners 229 and 227 are fastened to the rail once the guide lock 410 has been slid within the guide track 502 to secure the pin 230 through the lift cable 235 on either side of the lower bracket 250. In some examples, the fasteners 229, 227 are loosened when the lift cable 235 needs to be replaced or the movable barrier 190 is being serviced. After removing the fasteners 229 and 227, the guide lock 410 is retracted thereby retracting the pin 230 back into the lower bracket 250. This frees the lift cable 235 from the anchor system 241.

As will be explained herein, FIGS. 8A-8C may illustrate examples of installation and uninstallation (or attaching and disconnecting) of the lift cable 235 of the movable barrier system 100 to the movable barrier. The systems and methods described herein allow for installation and uninstallation of the lift cable 235 without disassembly and reassembly of the anchor system 241. For example, the integrated pin 230 may not need to be remove or detached from the anchor system 241. The anchor system 241 may need to be unfastened from the rail 210, but the anchor system 241 need not be disassembled. Among other reasons, assembly and disassembly is not required because the pin 230 is integrated with the anchor system 241. The lift cable 235 can be removed from the lower bracket assembly 200 and the anchor system 241 remains intact, ready to secure another lift cable 235 once another lift cable 235 is placed between the holes in the wall and the flange of the lower bracket 250. For example, a broken lift cable can be easily disconnected from the barrier and a new lift cable can be easily attached.

FIG. 8A is a front view of an anchor system of a movable barrier, according to examples of the present disclosure. For illustrative purposes, FIG. 8A does not shown the rail 210, the stile 240, or the roller holder 220. FIG. 8A shows the anchor system 241 in an unlocked and unfastened position, ready to secure the lift cable 235 positioned between the left wall 255 and the flange 275. Because the fasteners 229 and 227 have not yet fastened the guide lock 410 and lower bracket 250 to the rail 210, the guide lock 410 and the pin 230 (held together by the spring pin 411) are able to slide laterally back and forth within the guide track 502.

FIG. 8B is a front view of an anchor system of a movable barrier, according to examples of the present disclosure. For illustrative purposes, FIG. 8B does not shown the rail 210, the stile 240, or the roller holder 220. However, FIG. 8B does include the fasteners 229, 227. Typically, when the anchor system 241 is located inside the lower bracket 250, the fasteners 229, 227 would also extend through the rail 210. FIG. 8B shows the anchor system 241 in a fastened position, where the anchor system 241 has secured the lift cable 235 without disassembly. The pin 230 and the spring pin 411 both remain integrated in the anchor system 241. Relative to the position shown in FIG. 8A, the guide lock 410 has been slid within the guide track 502 to displace and extend the pin 230 through the left wall 255 of the lower bracket 250, through the lower loop 237 of the lift cable 235, and through the flange 275. The pin 230 has been extended out of the lower bracket 250 in the direction of arrow 802.

In some examples, after being actuated into this position, a locked position, the fastener 229 can be rotated or inserted into the hole 506 in the guide lock 410. Similarly, the fastener 227 may be rotated or inserted into the hole 510, preventing further lateral movement of the guide lock 410 and the pin 230, thereby locking the pin 230 through the lift cable 235. For illustrative purposes, FIG. 8B does not shown the rail 210. The fasteners 229, 227 may also be rotated or inserted through the holes in the rail 210 and the lower bracket 250, as described above. To uninstall the lift cable 235, the anchor system 241 can be unfastened such that the guide lock 410 and the pin 230 can move back to the original position shown in FIG. 8A. Throughout the installation and deinstallation of the lift cable 235, no assembly or disassembly of the anchor system 241 is required. In this regard, the anchor system 241 may be unfastened and fastened to the rail by the fasteners 229, 227, but the anchor system 241 including the cable pin 230, the guide lock 410, and the spring pin 411 all remain integrated and assembled together and positioned within the rail 210.

FIG. 8C is a front view of an anchor system of a movable barrier, according to examples of the present disclosure. For illustrative purposes, FIG. 8C does not shown the rail 210, the stile 240, or the roller holder 220. However, FIG. 8C includes the fasteners 229, 227. Typically, when the anchor system 241 is located inside the lower bracket 250, the fasteners 229, 227 would also extend through the rail 210. FIG. 8C shows the anchor system 241 in a locked and fastened position on the opposite side of the lower bracket 250 shown in FIG. 8C, where the anchor system 241 has secured the lift cable 235 without disassembly and disintegration of the pin 230, the spring pin 411, the guide lock 410. The position of the anchor system in FIG. 78 is similar to the position shown in FIG. 8B (i.e., a locked position). In this example, the guide lock 410 has moved within the lower bracket 250 to extend the pin 230 through the opposing side of the lower bracket 250, for use when securing the lift cable 235 to an opposing side of the movable barrier 190. The anchor system 241 has moved in the direction of arrow 804. The pin 230 has extended through the right wall 260, the lower loop 237 of the lift cable 235, and the hole 287 in the flange 280. In this example, the fasteners 229 and 227 are fastening the guide lock 410 to the rail 210 by extending through holes 508 and 504 of the guide lock 410. Because of the symmetric arrangement of the lower bracket 250, a single lock mechanism may be used to secure the lift cable on the right side of the lower bracket or the left side of the lower bracket.

Figure 9:
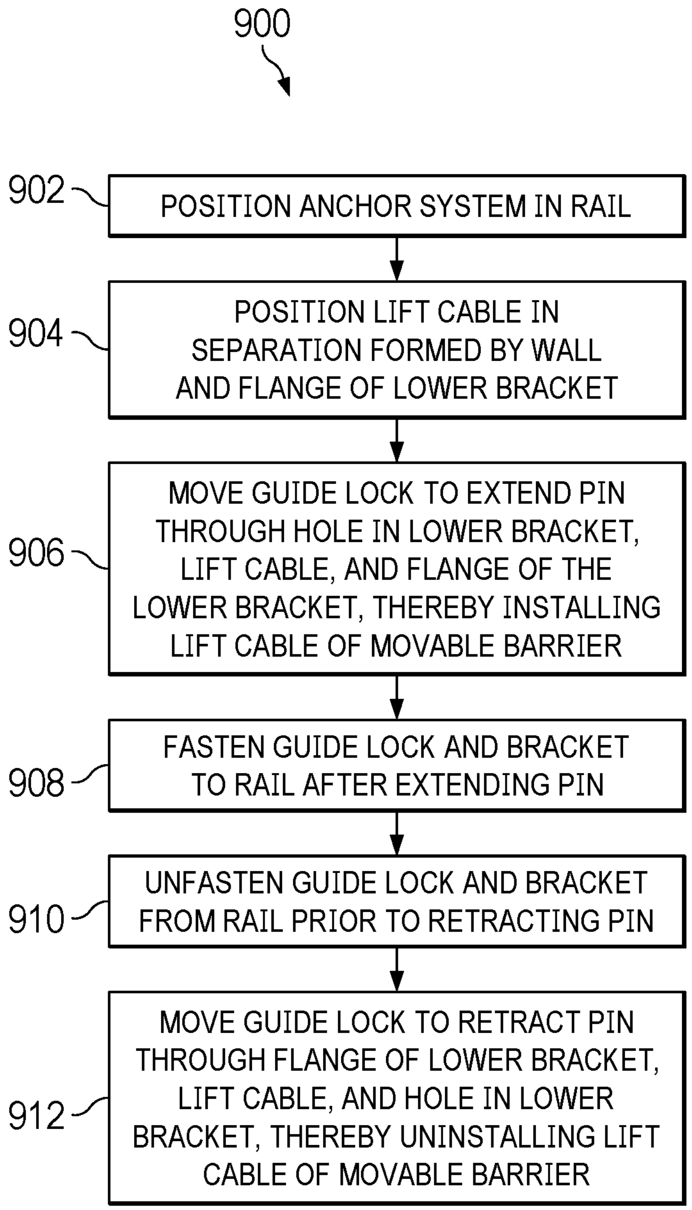
FIG. 9 is a flow chart of a method, according to examples of the present disclosure.

FIG. 9 shows an example of a method 900 for installing or uninstalling (attaching or disconnecting) a lift cable of a movable barrier system using an anchor system. While FIG. 9 illustrates operations according to one example, other examples may omit, add to, reorder, and/or modify any of the operations shown in FIG. 9.

The method 900 may start in some examples, with positioning the anchor system 241 in the inner cavity 211 of the rail 210 of the movable barrier system 100, as at operation 902. The anchor system 241 can be positioned in the inner cavity 211 before or after the lift cable 235 is secured to the movable barrier. In some examples, the anchor system 241 comprises the lower bracket 250 having the wall 255 having the hole 257. The lower bracket also has the wall 260 having the hole 287. The anchor system further comprises the guide lock 410 positioned at least partially within the lower bracket 250 and the pin 230 positioned in the retainer 420 of the guide lock 410.

Operation 904, in some examples, includes positioning the lift cable 235 in the separation or gap formed between the wall 255 and the flange 275. Once the lift cable 235 is positioned in the separation or gap, the anchor system 241 is ready to anchor the lift cable 235 to the movable barrier 190.

Operation 906, in some examples, includes moving the guide lock 410 to extending the pin 230 through the hole 257, the loop 237 of the lift cable 235, and the hole 277 of the flange 275. This installs the lift cable 235 to the movable barrier 190. Extending the pin may include sliding the guide lock 410 within the guide track 502 of the lower bracket 250. An actuating mechanism may be used in conjunction with the actuator 512, in any of the methods described above, to slide the guide lock 410.

Operation 908, in some examples, includes fastening the guide lock 410 and the lower bracket 250 to the rail 210. This can occur after extending the pin 230 as described in operation 906. However, as described previously, it is also contemplated that the guide lock 410 can be fastened prior to extension of the pin 230 when the pin 230 is able to move relative to the guide lock 410. Fastening the guide lock 410 and the lower bracket 250 to the rail 210 ensures that the pin 230 is not able to dislodge from the loop 237 of the lift cable 235. Further, it ensures that the pin 230 remains fully extended through the hole 277 in the flange 275.

Once the lift cable 235 is installed and secured to the movable barrier 190, the movable barrier 190 can be operated. Over time, lift cables may malfunction or break. In other instances, maintenance may be required even though the lift cable is still functioning. Alternatively, lift cables may be replaced proactively. When uninstallation is desired, the anchor system 241 described herein is able to uninstall the lift cable without requiring disassembly of the anchor system 241.

The uninstallation may include unfastening the guide lock 410 and the lower bracket 250 from the rail 210, as indicated in operation 910. This can occur prior to retracting the pin 230. Unfastening the guide lock 410 allows the guide lock 410 to slide within the guide track 502.

Continuing with the method 900, operation 912, in some examples, includes moving the guide lock 410 to retract the pin 230 through the hole 277, the loop 237 of the lift cable 235, and the hole 257 in the wall of the lower bracket 250. This is done by laterally displacing the guide lock 410, which in turn retracts the pin 230. Once the pin 230 is retracted from out of the lift cable 235, the lift cable is uninstalled and freed from the movable barrier 190, allowing the lift cable 235 to be serviced or replaced. In this way, according to the systems and methods described herein, the installation and uninstallation of the lift cable 235 can occur without disassembling or reassembling the anchor system 241. It is advantageous that the pin 230 and spring pin 411 remain attached and connected to the guide lock 410.

Persons of ordinary skill in the art will appreciate that the implementations encompassed by the present disclosure are not limited to the particular exemplary implementations described above. In that regard, although illustrative implementations have been shown and described, a wide range of modification, change, combination, and substitution is contemplated in the foregoing disclosure. It is understood that such variations may be made to the foregoing without departing from the scope of the present disclosure. Accordingly, it is appropriate that the appended claims be construed broadly and in a manner consistent with the present disclosure.

What is claimed is:

1. An anchor system for securing a lift cable to a movable barrier, comprising:
- a pin couplable to the lift cable;
- a bracket attachable to the movable barrier, the bracket comprising:
  - a first wall having a first hole;
  - a second wall spaced from the first wall to receive the lift cable therebetween, the second wall having a second hole, the first hole and the second hole aligned and configured to receive the pin; and
  - a first portion of a third wall extending obliquely relative to the first wall; and
- a guide lock shaped to fit at least partially within the bracket, and movable relative to the bracket between a position where the lift cable is couplable to the pin and a position where the lift cable is uncouplable from the pin, the guide lock being configured to displace the pin, wherein the pin is removably couplable to the guide lock.

2. The anchor system of claim 1, wherein the bracket is configured to distribute loads applied to the pin to the movable barrier when the movable barrier is lifted.

3. The anchor system of claim 1, further comprising a spring pin configured to extend through a first spring pin hole in the guide lock and through a second spring pin hole in the pin to hold the pin in the guide lock.

4. The anchor system of claim 1, wherein the first portion of the third wall includes a first portion of a guide track configured to receive the guide lock.

5. The anchor system of claim 4, wherein the guide lock is configured to slide within the first portion of the guide track to a first position to secure the lift cable to the pin between the first wall and the second wall.

6. An anchor system for securing a lift cable to a movable barrier, comprising:
- a pin couplable to the lift cable;
- a bracket attachable to the movable barrier, the bracket comprising:
  - a first wall having a first hole;
  - a second wall spaced from the first wall to receive the lift cable therebetween, the second wall having a second hole, the first hole and the second hole aligned and configured to receive the pin;
  - a first portion of a third wall extending obliquely relative to the first wall;
  - a fourth wall having a fourth hole; and
  - a fifth wall spaced from the fourth wall to receive the lift cable therebetween, the fifth wall having a fifth hole, the fourth hole and the fifth hole aligned and configured to receive the pin couplable to the lift cable; and
- a guide lock shaped to fit at least partially within the bracket, and movable relative to the bracket between a position where the lift cable is couplable to the pin and a position where the lift cable is uncouplable from the pin, the guide lock being configured to displace the pin.

7. The anchor system of claim 5, wherein the bracket further comprises:
- a fourth wall having a fourth hole; and
- a fifth wall spaced from the fourth wall to receive the lift cable therebetween, the fifth wall having a fifth hole, the fourth hole and the fifth hole aligned and configured to receive the pin couplable to the lift cable,
- wherein a second portion of the third wall extends obliquely relative to the fourth wall and includes a second portion of the guide track configured to receive the guide lock, and wherein the guide lock is further configured to slide within the second portion of the guide track to a second position to secure the lift cable to the movable barrier between the fourth wall and the fifth wall.

8. The anchor system of claim 1, further comprising at least one fastener configured to couple the guide lock and the bracket to the movable barrier.

9. A movable barrier system having a barrier movable by a lift cable, comprising:
- a rail extending horizontally with respect to the barrier, the rail having a first inner cavity at a first end of the rail and a second inner cavity at a second end of the rail; and
- an anchor system configured to be positioned at least partially in the first or second inner cavity, comprising:
  - a bracket comprising:
    - a first wall having a first hole; and
    - a first flange extending from the first wall and having a first flange hole, the first hole and the first flange hole spaced by a first separation;
  - a guide lock configured to be positioned at least partially in the bracket; and
  - a pin configured to be positioned at least partially in the guide lock.

10. The movable barrier system of claim 9, wherein the guide lock is configured to slide within a guide track of the bracket to extend the pin across the first separation to secure the lift cable to the rail when the anchor system is positioned at least partially in the first inner cavity.

11. The movable barrier system of claim 10, wherein the bracket further comprises:

a second wall having a second hole; and a second flange extending from the second wall and having a second flange hole, the second hole and the second flange hole spaced by a second separation.

12. The movable barrier system of claim 11, wherein the guide lock is further configured to slide within the guide track of the bracket to extend the pin across the second separation to secure the lift cable to the rail when the anchor system is positioned within the second inner cavity.

13. The movable barrier system of claim 9, further comprising a spring pin configured to extend through a first spring pin hole in the guide lock and through a second spring pin hole in the pin to hold the pin in the guide lock.

14. The movable barrier system of claim 9, further comprising at least one fastener configured to fasten the guide lock and the bracket to an inner surface of the rail.

15. The movable barrier system of claim 14, wherein the at least one fastener is further configured to couple a roller tube to an outer surface of the rail.

16. A method for installing or uninstalling a lift cable of a movable barrier system using an anchor system, comprising:

positioning the anchor system in an inner cavity of a rail of the movable barrier system, the anchor system comprising:

a bracket comprising a first wall having a first hole and a second wall extending from the first wall and having a second hole;

a guide lock positioned at least partially within the bracket; and a pin positioned in the guide lock; and moving the guide lock to extend or retract the pin through the first hole, through a loop of a lift cable disposed between the first wall and the second wall, and through the second hole to install or uninstall the lift cable.

17. The method of claim 16, wherein moving the guide lock to extend or retract the pin through the first hole comprises sliding the guide lock within a guide track of the bracket.

18. The method of claim 16, further comprising a) fastening the guide lock and the bracket to the rail after extending the pin, b) unfastening the guide lock and the bracket from the rail prior to retracting the pin, or both a) and b).

* * * * *